US008553022B2

(12) United States Patent
Handa et al.

(10) Patent No.: US 8,553,022 B2
(45) Date of Patent: Oct. 8, 2013

(54) IMAGE DISPLAY DEVICE AND DRIVING METHOD OF IMAGE DISPLAY DEVICE

(75) Inventors: Tomoaki Handa, Tokyo (JP); Yuuki Seo, Kanagawa (JP); Katsuhide Uchino, Kanagawa (JP)

(73) Assignee: Sony Corporation, Tokyo (JP)

( * ) Notice: Subject to any disclaimer, the term of this patent is extended or adjusted under 35 U.S.C. 154(b) by 1112 days.

(21) Appl. No.: 12/458,756

(22) Filed: Jul. 22, 2009

(65) Prior Publication Data

US 2010/0045648 A1 Feb. 25, 2010

(30) Foreign Application Priority Data

Aug. 22, 2008 (JP) ................................. 2008-213512

(51) Int. Cl.
*G06F 3/038* (2013.01)

(52) U.S. Cl.
USPC ................................ 345/211; 345/42; 345/90

(58) Field of Classification Search
USPC ........... 345/38-39, 42-47, 48, 50, 55, 76-77, 345/83-84, 87-100, 204-205, 207-214, 345/690
See application file for complete search history.

(56) References Cited

U.S. PATENT DOCUMENTS

| | | | | |
|---|---|---|---|---|
| 6,525,710 | B1 * | 2/2003 | Kwon | 345/100 |
| 7,046,225 | B2 * | 5/2006 | Chou | 345/92 |
| 7,195,949 | B2 * | 3/2007 | Winters | 438/99 |
| 8,174,466 | B2 * | 5/2012 | Toyomura et al. | 345/76 |
| 8,269,697 | B2 * | 9/2012 | Handa et al. | 345/76 |
| 2004/0174349 | A1 * | 9/2004 | Libsch et al. | 345/204 |
| 2007/0126670 | A1 * | 6/2007 | Iwabuchi et al. | 345/76 |
| 2007/0268210 | A1 * | 11/2007 | Uchino et al. | 345/55 |
| 2009/0278779 | A1 * | 11/2009 | Liu et al. | 345/98 |

FOREIGN PATENT DOCUMENTS

| | | | |
|---|---|---|---|
| JP | 2002-236477 | A | 8/2002 |
| JP | 2005-164850 | A | 6/2005 |
| JP | 2007-133284 | | 5/2007 |
| JP | 2007-310311 | | 11/2007 |
| JP | 2008-033091 | A | 2/2008 |
| JP | 2010-021483 | A | 1/2010 |

OTHER PUBLICATIONS

Japanese Office Action issued Sep. 7, 2010 for corresponding Japanese Application No. 2008-213512.

* cited by examiner

*Primary Examiner* — William Boddie
*Assistant Examiner* — Mansour M Said
(74) *Attorney, Agent, or Firm* — Rader, Fishman & Grauer PLLC

(57) ABSTRACT

Disclosed herein is an image display device including a display section, a signal line driving circuit, and a scanning line driving circuit. The display section is formed by arranging pixel circuits in a form of a matrix. The signal line driving circuit is configured to output a driving signal for a signal line to the signal line of the display section. The scanning line driving circuit is configured to output a driving signal for a scanning line to the scanning line of the display section. The pixel circuits each include at least a light emitting element, a driving transistor configured to drive the light emitting element connected to a source by a driving current corresponding to a gate-to-source voltage, a storage capacitor configured to retain the gate-to-source voltage, and a writing transistor configured to set a terminal voltage of the storage capacitor by a voltage of the signal line.

17 Claims, 13 Drawing Sheets

RELATED ART

RELATED ART

RELATED ART

RELATED ART

RELATED ART

RELATED ART

RELATED ART

RELATED ART

IMAGE DISPLAY DEVICE AND DRIVING METHOD OF IMAGE DISPLAY DEVICE

BACKGROUND OF THE INVENTION

1. Field of the Invention

The present invention relates to an image display device and a driving method of the image display device, and is applicable to an active matrix type image display device using an organic EL (Electro Luminescence) element, for example. The present invention makes it possible to correct variations in characteristic of a driving transistor due to the layout of pixel circuits by correcting difference in the on characteristic of the driving transistor, which difference results from a starting position of irradiation of the driving transistor with a laser beam differing between adjacent pixel circuits created in axisymmetric form, through the setting of voltage of a driving signal for a signal line.

2. Description of the Related Art

The development of active matrix type image display devices using organic EL elements has recently been actively pursued. Image display devices using organic EL elements utilize the light emitting phenomenon of an organic thin film that emits light when an electric field is applied to the organic thin film. An organic EL element can be driven by an application voltage of 10 [V] or lower. Therefore this kind of image display device can reduce power consumption. In addition, the organic EL element is a self-luminous element. Therefore this kind of image display device does not need a backlight, and can thus be reduced in weight and thickness. Further, the organic EL element has a feature of a fast response speed of a few microseconds. Therefore this kind of image display device has a feature in that an afterimage hardly occurs at a time of displaying a moving image.

Specifically, an active matrix type image display device using the organic EL element has a display section formed by arranging pixel circuits including organic EL elements and driving circuits for driving the organic EL elements in the form of a matrix. This kind of image display device drives each pixel circuit by a signal line driving circuit and a scanning line driving circuit disposed on the periphery of the display section via a signal line and a scanning line provided in the display section, and thereby displays a desired image.

In relation to the image display device using the organic EL element, Japanese Patent Laid-Open No. 2007-310311 (referred to as Patent Document 1 hereinafter) discloses a method of forming a pixel circuit using two transistors. Thus, the method disclosed in Patent Document 1 can simplify a constitution. Patent Document 1 also discloses a constitution that corrects variations in threshold voltage and variations in mobility of a driving transistor for driving the organic EL element. Thus, the constitution disclosed in Patent Document 1 can prevent degradation in image quality due to variations in threshold voltage and variations in mobility of the driving transistor.

FIG. 6 is a block diagram showing an image display device disclosed in Patent Document 1. This image display device 1 has a display section 2 created on an insulating substrate of glass or the like. The image display device 1 has a signal line driving circuit 3 and a scanning line driving circuit 4 created on the periphery of the display section 2.

The display section 2 is formed by arranging pixel circuits 5 in the form of a matrix. Pixels (PIX) 6 are formed by organic EL elements disposed in the pixel circuits 5. Incidentally, in an image display device for color images, one pixel is formed by a plurality of sub-pixels of red, green, and blue. Thus, in the case of the image display device for color images, the display section 2 is formed by sequentially arranging pixel circuits 5 for red, green, and blue forming sub-pixels of red, green, and blue, respectively.

The signal line driving circuit 3 outputs driving signals Ssig for signal lines to signal lines DTL disposed in the display section 2. More specifically, a data scan circuit 3A in the signal line driving circuit 3 sequentially latches image data D1 input in order of raster scanning, distributes the image data D1 to the signal lines DTL, and thereafter subjects each piece of the image data D1 to digital-to-analog conversion processing. The signal line driving circuit 3 generates the driving signals Ssig by processing a result of the digital-to-analog conversion. Thereby the image display device 1 sets the gradation of each pixel circuit 5 on a so-called line-sequential basis, for example.

The scanning line driving circuit 4 outputs a writing signal WS and a driving signal DS to scanning lines WSL for the writing signal and scanning lines DSL for power supply, the scanning lines WSL and the scanning lines DSL being disposed in the display section 2. The writing signal WS is a signal for performing on-off control of a writing transistor disposed in each pixel circuit 5. The driving signal DS is a signal for controlling the drain voltage of a driving transistor disposed in each pixel circuit 5. A write scan circuit (WSCN) 4A and a drive scan circuit (DSCN) 4B in the scanning line driving circuit 4 respectively generate the writing signal WS and the driving signal DS by processing a predetermined sampling pulse SP by a clock CK.

FIG. 7 is a connection diagram showing the configuration of a pixel circuit 5 in detail. In the pixel circuit 5, the cathode of an organic EL element 8 is set at a predetermined negative side voltage. In the example of FIG. 7, the negative side voltage is set at the voltage of a ground line. In the pixel circuit 5, the anode of the organic EL element 8 is connected to the source of a driving transistor Tr2. Incidentally, the driving transistor Tr2 is an N-channel type transistor formed by a TFT, for example. In the pixel circuit 5, the drain of the driving transistor Tr2 is connected to a scanning line DSL for power supply. The scanning line DSL is supplied with the driving signal DS for power supply from the scanning line driving circuit 4. Thereby the pixel circuit 5 current-drives the organic EL element 8 using the driving transistor Tr2 of a source-follower circuit configuration.

The pixel circuit 5 has a storage capacitor Cs disposed between the gate and the source of the driving transistor Tr2. The voltage of a gate side terminal of the storage capacitor Cs is set to the voltage of a driving signal Ssig by the writing signal WS. As a result, the pixel circuit 5 current-drives the organic EL element 8 by the driving transistor Tr2 according to a gate-to-source voltage Vgs corresponding to the driving signal Ssig. Incidentally, a capacitance Cel in FIG. 7 is the stray capacitance of the organic EL element 8. Suppose in the following that the capacitance Cel is sufficiently large as compared with the storage capacitor Cs, and that the parasitic capacitance of a gate node of the driving transistor Tr2 is sufficiently small as compared with the storage capacitor Cs.

Specifically, in the pixel circuit 5, the gate of the driving transistor Tr2 is connected to a signal line DTL via a writing transistor Tr1 that performs on-off operation according to the writing signal WS. Incidentally, the writing transistor Tr1 is an N-channel type transistor formed by a TFT, for example. The signal line driving circuit 3 outputs the driving signal Ssig by switching between a gradation setting voltage Vsig and a voltage Vofs for threshold voltage correction in predetermined timing. The fixed voltage Vofs for threshold voltage correction is a fixed voltage used to correct variation in threshold voltage of the driving transistor Tr2. The gradation setting voltage Vsig is a voltage specifying the light emission luminance of the organic EL element 8, and is a voltage obtained by adding the fixed voltage Vofs for threshold voltage correction to a gradation voltage Vin. The gradation voltage Vin corresponds to the light emission luminance of the organic EL element 8. The gradation voltage Vin is generated for each signal line DTL by subjecting the image data D1 distributed to each signal line DTL to digital-to-analog conversion processing.

In the pixel circuit 5, as shown in FIGS. 8A, 8B, 8C, 8D, and 8E, the writing transistor Tr1 is set in an off state by the writing signal WS during an emission period for making the organic EL element 8 emit light (FIG. 8A). In addition, in the pixel circuit 5, the driving transistor Tr2 is supplied with a power supply voltage Vcc by the driving signal DS for power supply during the emission period (FIG. 8B). Thereby, as shown in FIG. 9, the pixel circuit 5 makes the organic EL element 8 emit light with a driving current Ids corresponding to the gate-to-source voltage Vgs (FIGS. 8D and 8E) of the driving transistor Tr2, which voltage is the voltage across the storage capacitor Cs, during the emission period.

In the pixel circuit 5, the driving signal DS for power supply is lowered to a predetermined fixed voltage Vss at time t0 at which the emission period ends (FIG. 8B). The fixed voltage Vss is a sufficiently low voltage to make the drain of the driving transistor Tr2 function as a source, and is a voltage lower than the cathode voltage of the organic EL element 8.

Thereby, in the pixel circuit 5, as shown in FIG. 10, a stored charge of the terminal on the organic EL element 8 side of the storage capacitor Cs flows out to the scanning line via the driving transistor Tr2. As a result, in the pixel circuit 5, the source voltage Vs of the driving transistor Tr2 is lowered to substantially the voltage Vss (FIG. 8E), and the organic EL element 8 stops emitting light. In addition, in the pixel circuit 5, the gate voltage Vg of the driving transistor Tr2 is lowered in such a manner as to be interlocked with the lowering of the source voltage Vs (FIG. 8D).

In the pixel circuit 5, at subsequent predetermined time t1, the writing transistor Tr1 is changed to an on state by the writing signal WS (FIG. 8A), and the gate voltage Vg of the driving transistor Tr2 is set to the fixed voltage Vofs for threshold voltage correction which voltage is set in the signal line DTL (FIGS. 8C and 8D). Thereby, in the pixel circuit 5, as shown in FIG. 11, the gate-to-source voltage Vgs of the driving transistor Tr2 is set to substantially a voltage Vofs−Vss. In the pixel circuit 5, the voltage Vofs−Vss is set larger than the threshold voltage Vth of the driving transistor Tr2 by the setting of the voltages Vofs and Vss.

Thereafter, in the pixel circuit 5, the drain voltage of the driving transistor Tr2 is raised to the power supply voltage Vcc by the driving signal DS at time t2 (FIG. 8B). Thereby, in the pixel circuit 5, as shown in FIG. 12, a charging current Ids flows from the power supply Vss into the terminal on the organic EL element 8 side of the storage capacitor Cs via the driving transistor Tr2. As a result, in the pixel circuit 5, the voltage Vs of the terminal on the organic EL element 8 side of the storage capacitor Cs rises gradually. In this case, the current Ids flowing into the organic EL element 8 via the driving transistor Tr2 in the pixel circuit 5 is used to charge the capacitance Cel of the organic EL element 8 and the storage capacitor Cs. As a result, the source voltage Vs of the driving transistor Tr2 simply rises without the organic EL element 8 emitting light.

In the pixel circuit 5, when the voltage across the storage capacitor Cs becomes the threshold voltage Vth of the driving transistor Tr2, the charging current Ids stops flowing in via the driving transistor Tr2. Thus, in this case, the rise in the source voltage Vs of the driving transistor Tr2 stops when the potential difference across the storage capacitor Cs becomes the threshold voltage Vth of the driving transistor Tr2. Thereby, the pixel circuit 5 discharges the voltage across the storage capacitor Cs via the driving transistor Tr2, and sets the voltage across the storage capacitor Cs to the threshold voltage Vth of the driving transistor Tr2.

In the pixel circuit 5, at time t3 after the passage of a sufficient time to set the voltage across the storage capacitor Cs to the threshold voltage Vth of the driving transistor Tr2, as shown in FIG. 13, the writing transistor Tr1 is changed to an off state by the writing signal WS (FIG. 8A). Next, as shown in FIG. 14, the voltage of the signal line DTL is set to a gradation setting voltage Vsig (=Vin+Vofs).

In the pixel circuit 5, the writing transistor Tr1 is set in an on state at next time t4 (FIG. 8A). Thereby, in the pixel circuit 5, as shown in FIG. 15, the gate voltage Vg of the driving transistor Tr2 is set to the gradation setting voltage Vsig, and the gate-to-source voltage Vgs of the driving transistor Tr2 is set to a voltage obtained by adding the threshold voltage Vth of the driving transistor Tr2 to the gradation voltage Vin. Thereby, the pixel circuit 5 can drive the organic EL element 8 while effectively avoiding variation in the threshold voltage Vth of the driving transistor Tr2, and thus prevent degradation in image quality due to variation in light emission luminance of the organic EL element 8.

In the pixel circuit 5, when the gate voltage Vg of the driving transistor Tr2 is set to the gradation setting voltage Vsig, the gate of the driving transistor Tr2 is connected to the signal line DTL for a certain period in a state of the drain voltage of the driving transistor Tr2 being maintained at the power supply voltage Vcc. Thereby the pixel circuit 5 also corrects variation in mobility μ of the driving transistor Tr2.

Specifically, when the gate of the driving transistor Tr2 is connected to the signal line DTL by setting the writing transistor Tr1 in an on state in a state of the voltage across the storage capacitor Cs being set at the threshold voltage Vth of the driving transistor Tr2, the gate voltage Vg of the driving transistor Tr2 gradually rises from the fixed voltage Vofs, and is set to the gradation setting voltage Vsig.

In the pixel circuit 5, a writing time constant necessary for the rising of the gate voltage Vg of the driving transistor Tr2 is set shorter than a time constant necessary for the rising of the source voltage Vs of the driving transistor Tr2.

In this case, after the writing transistor Tr1 performs an on operation, the gate voltage Vg of the driving transistor Tr2 rapidly rises to the gradation setting voltage Vsig (Vofs+Vin). At the time of the rising of the gate voltage Vg, when the capacitance Cel of the organic EL element 8 is sufficiently large as compared with the storage capacitor Cs, the source voltage Vs of the driving transistor Tr2 does not change.

However, when the gate-to-source voltage Vgs of the driving transistor Tr2 exceeds the threshold voltage Vth, the current Ids flows in from the power supply Vcc via the driving transistor Tr2, and the source voltage Vs of the driving transistor Tr2 rises gradually. As a result, in the pixel circuit 5, the voltage across the storage capacitor Cs is discharged via the driving transistor Tr2, and the rising speed of the gate-to-source voltage Vgs is decreased.

The discharge speed of the voltage across the storage capacitor Cs changes according to a capability of the driving transistor Tr2. More specifically, the higher the mobility μ of the driving transistor Tr2, the faster the discharge speed.

As a result, the pixel circuit 5 is set such that the higher the mobility μ of the driving transistor Tr2, the more the voltage across the storage capacitor Cs is decreased, whereby variation in light emission luminance due to variation in mobility is corrected. Incidentally, the decrease in the voltage across the storage capacitor Cs which decrease is involved in correcting the mobility μ is denoted by ΔV in FIG. 8, FIG. 15, and FIG. 16.

In the pixel circuit 5, the writing signal WS is lowered at time t5 after the passage of the period for correcting the mobility μ. As a result, the pixel circuit 5 starts an emission period, and makes the organic EL element 8 emit light by a driving current Ids corresponding to the voltage across the storage capacitor Cs, as shown in FIG. 16. Incidentally, when the pixel circuit 5 starts the emission period, the gate voltage Vg and the source voltage Vs of the driving transistor Tr2 rise due to a so-called bootstrap circuit. Vel in FIG. 16 is the voltage of the rise.

Thereby, the pixel circuit 5 prepares for the process of correcting the threshold voltage of the driving transistor Tr2 during a period from time t0 to time t2 during which period the gate voltage of the driving transistor Tr2 is lowered to the voltage Vss. During the next period from time t2 to time t3, the voltage across the storage capacitor Cs is set to the threshold voltage Vth of the driving transistor Tr2, and thereby the threshold voltage of the driving transistor Tr2 is corrected. In addition, during a period from time t4 to time t5, the mobility μ of the driving transistor Tr2 is corrected, and the gradation setting voltage Vsig is sampled.

FIG. 17 is a plan view of the layout of a pixel circuit 5 according to the constitution disclosed in Patent Document 1. FIG. 17 is a plan view of a substrate side as viewed with members of an upper layer from the anode electrode of the organic EL element 8 removed, and is a diagram showing the layout of the driving transistor Tr2 and the like by a wiring pattern formed on the substrate. In FIG. 17, the wiring pattern of each layer is shown by different hatching. In addition, a circular mark represents an interlayer contact.

In the pixel circuit 5, first wiring is created by depositing a wiring pattern material layer on an insulating substrate 9 of glass, for example, and thereafter subjecting the wiring pattern material layer to an etching process. In the pixel circuit 5, the gate side electrode of the storage capacitor Cs, a part of the signal line DTL, and the gate electrodes G of the writing transistor Tr1 and the driving transistor Tr2 are created by the first wiring. In the pixel circuit 5, a gate insulating layer, an amorphous silicon layer and the like are next created sequentially, and thereafter the amorphous silicon layer is subjected to an annealing process by irradiation with a laser beam.

In the pixel circuit 5, second wiring is created next by depositing a wiring pattern material layer and thereafter subjecting the wiring pattern material layer to an etching process. In the pixel circuit 5, the source side electrode of the storage capacitor Cs, the source electrode S and drain electrode D of the writing transistor Tr1, and the source electrode S and drain electrode D of the driving transistor Tr2 are created by the second wiring.

Japanese Patent Laid-Open No. 2007-133284 (referred to as Patent Document 2 hereinafter) proposes a constitution in which the process of correcting variation in threshold voltage of the driving transistor Tr2 is divided and performed a plurality of times. According to the constitution disclosed in Patent Document 2, a sufficient time can be allocated to the correction of variation in threshold voltage even when a time assigned to the setting of a gradation of a pixel circuit is shortened with increase in precision. Thus, degradation in image quality due to threshold voltage variation can be prevented even when precision is increased.

SUMMARY OF THE INVENTION

In the image display device 1 described with reference to FIG. 6, a sufficient capacitance needs to be secured for the storage capacitor Cs because the pixel circuit 5 operates by a bootstrap circuit. Accordingly, a sufficient area needs to be secured for the storage capacitor Cs in each pixel circuit 5.

Accordingly, creating an odd-numbered pixel circuit 5O and an even-numbered pixel circuit 5E from a left end in axisymmetric form with respect to a signal line DTL as shown in FIG. 18 by contrast with FIG. 17 is considered. In this case, wiring patterns connecting the scanning line DSL of a driving signal DS for power supply to the drains of driving transistors Tr2 in the adjacent pixel circuits 5O and 5E can be arranged back to back in proximity to each other. It is thus possible to reduce an area occupied by the wiring patterns by integrating the back-to-back wiring patterns into one wiring pattern, and secure a sufficient area for the storage capacitor Cs. Incidentally, in FIG. 18, reference characters S and D denote the source and the drain of the driving transistor Tr2. In addition, pixel circuits corresponding to sub-pixels of red, green, and blue forming one pixel of a color image are denoted by reference characters R, G, and B.

However, when the pixel circuits 5O and 5E adjacent to each other are thus created in axisymmetric form with respect to the signal line DTL, there is a problem in that the on characteristic of the driving transistor Tr2 differs between the odd-numbered pixel circuit 5O and the even-numbered pixel circuit 5E from the left end. Specifically, the mobility of the driving transistor Tr2 differs between the odd-numbered pixel circuit 5O and the even-numbered pixel circuit 5E. As a result, luminance nonuniformity of fine vertical stripes occurs on a display screen.

It is considered that when variations in characteristic of the driving transistor due to the layout of such pixel circuits can be corrected, this kind of image display device can be further improved in image quality.

The present invention has been made in view of the above points. It is desirable to propose an image display device and a driving method of the image display device that can correct variations in characteristic of the driving transistor due to the layout of pixel circuits.

A first embodiment of the present invention is applied to an image display device, the image display device including: a display section formed by arranging pixel circuits in a form of a matrix; a signal line driving circuit configured to output a driving signal for a signal line to the signal line of the display section; and a scanning line driving circuit for outputting a driving signal for a scanning line to the scanning line of the display section. The pixel circuits each include at least a light emitting element, a driving transistor configured to drive the light emitting element connected to a source by a driving current corresponding to a gate-to-source voltage, a storage capacitor configured to retain the gate-to-source voltage, and a writing transistor configured to set a terminal voltage of the storage capacitor by a voltage of the signal line. At least the driving transistor is created by being subjected to an annealing process by irradiation with a laser beam. In the display section, adjacent pixel circuits are created in axisymmetric form with respect to the scanning line and/or the signal line, and difference between on characteristics of driving transistors in the adjacent pixel circuits, the difference being caused by a difference between starting positions of irradiation of the driving transistors with the laser beam in the adjacent pixel circuits due to creation of the adjacent pixel circuits in axisymmetric form, is corrected by a setting of voltage of the driving signal for the signal line.

A second embodiment of the present invention is applied to a driving method of an image display device, the image display device including: a display section formed by arranging pixel circuits in a form of a matrix; a signal line driving circuit configured to output a driving signal for a signal line to the signal line of the display section; and a scanning line driving circuit configured to output a driving signal for a scanning line to the scanning line of the display section. The pixel circuits each include at least a light emitting element, a driving transistor configured to drive the light emitting element connected to a source by a driving current corresponding to a gate-to-source voltage, a storage capacitor configured to retain the gate-to-source voltage, and a writing transistor configured to set a terminal voltage of the storage capacitor by a voltage of the signal line. At least the driving transistor is created by being subjected to an annealing process by irradiation with a laser beam. In the display section, adjacent pixel circuits are created in axisymmetric form with respect to the scanning line and/or the signal line. In the driving method of the image display device, difference between on characteristics of driving transistors in the adjacent pixel circuits, the difference being caused by a difference between starting positions of irradiation of the driving transistors with the laser beam in the adjacent pixel circuits due to creation of the adjacent pixel circuits in axisymmetric form, is corrected by a setting of voltage of the driving signal for the signal line.

With the constitution according to the first embodiment or the second embodiment, when adjacent pixel circuits are created in axisymmetric form with respect to the scanning line and/or the signal line, a starting position of irradiation with a laser beam in a driving transistor annealing process differs between the adjacent pixel circuits. As a result, temperature change by the annealing process differs between the adjacent pixel circuits, and the difference in temperature change causes a difference in on characteristic. Therefore the characteristic of the driving transistor varies due to the layout of the pixel circuits. Thus, variations in the characteristic of the driving transistor due to the layout of the pixel circuits can be corrected when the difference between the on characteristics of the driving transistors in the adjacent pixel circuits is corrected by the setting of voltage of the driving signal for the signal line with the constitution according to the first embodiment or the second embodiment.

According to the present embodiments, it is possible to correct variations in characteristic of a driving transistor due to the layout of pixel circuits.

DETAILED DESCRIPTION OF THE PREFERRED EMBODIMENTS

Preferred embodiments of the present invention will hereinafter be described in detail with reference to the drawings as appropriate.

First Embodiment

Constitution of Embodiment

Figure 1:
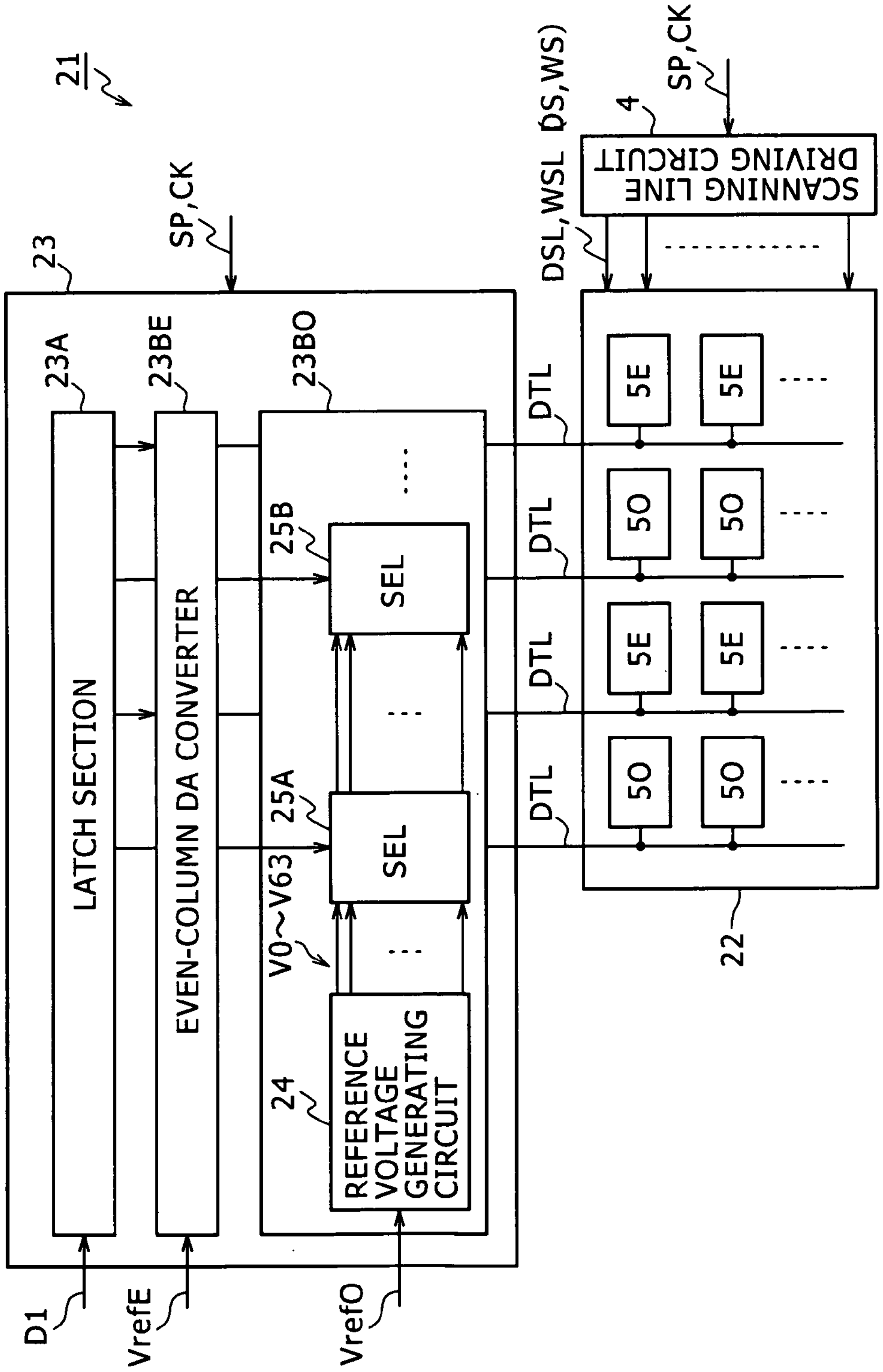
FIG. 1 is a block diagram showing an image display device according to a first embodiment of the present invention.
Figure 2:
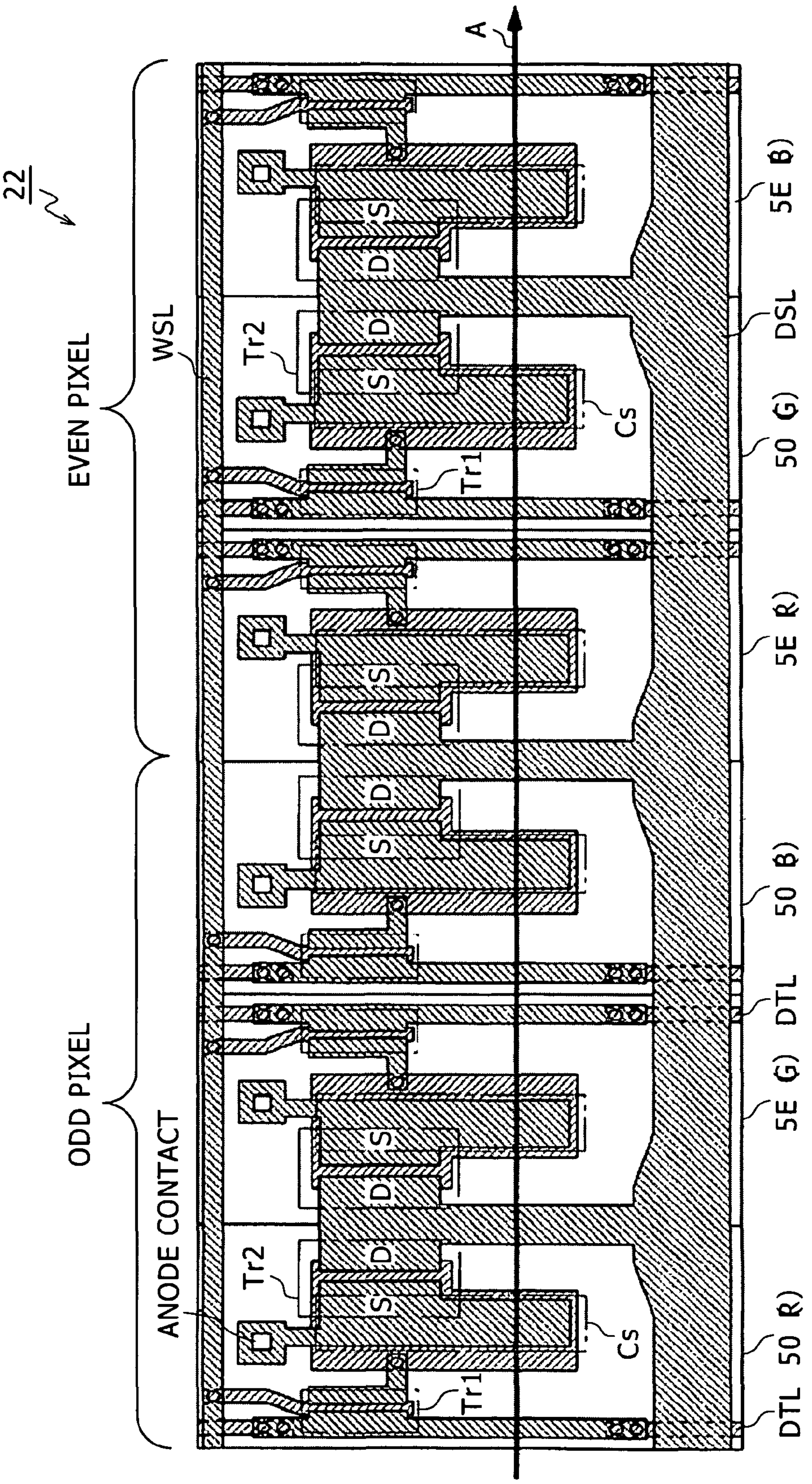
FIG. 2 is a plan view of a constitution of a display section in the image display device of FIG. 1.
Figure 7:
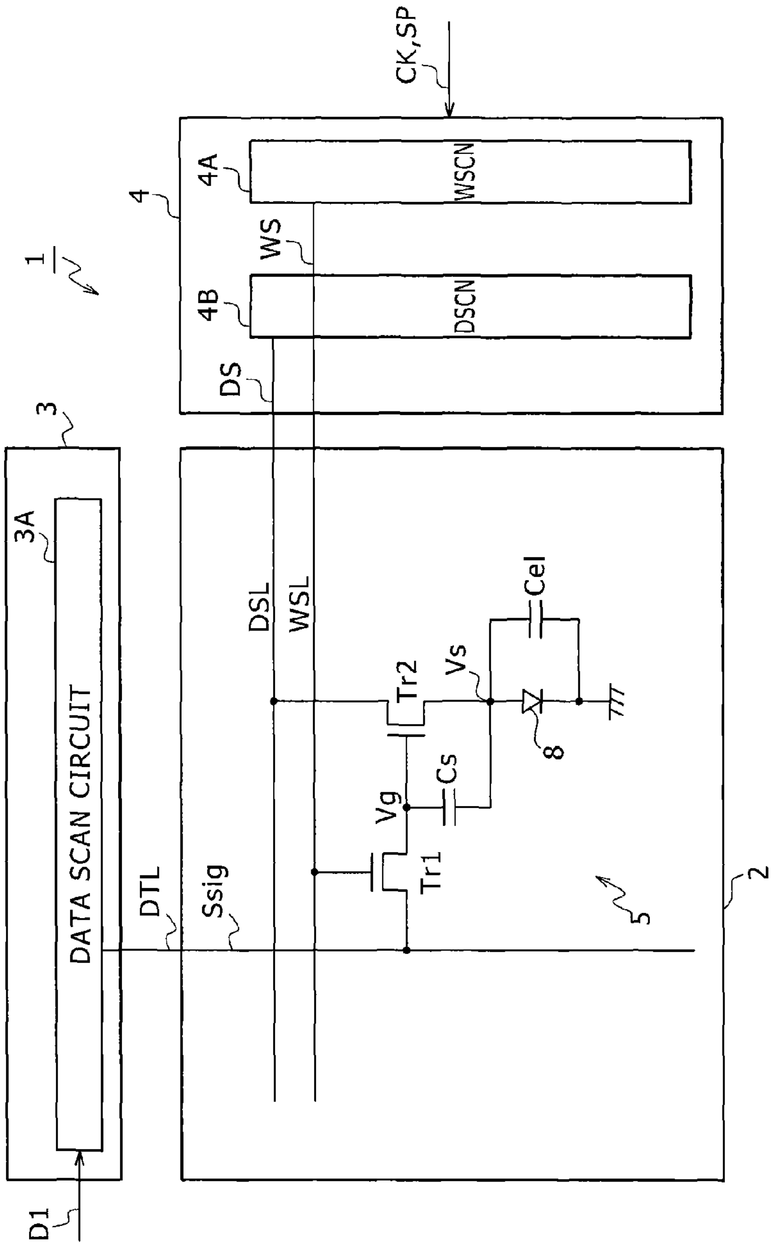
FIG. 7 is a connection diagram showing a detailed configuration of the image display device of FIG. 6.
Figure 18:
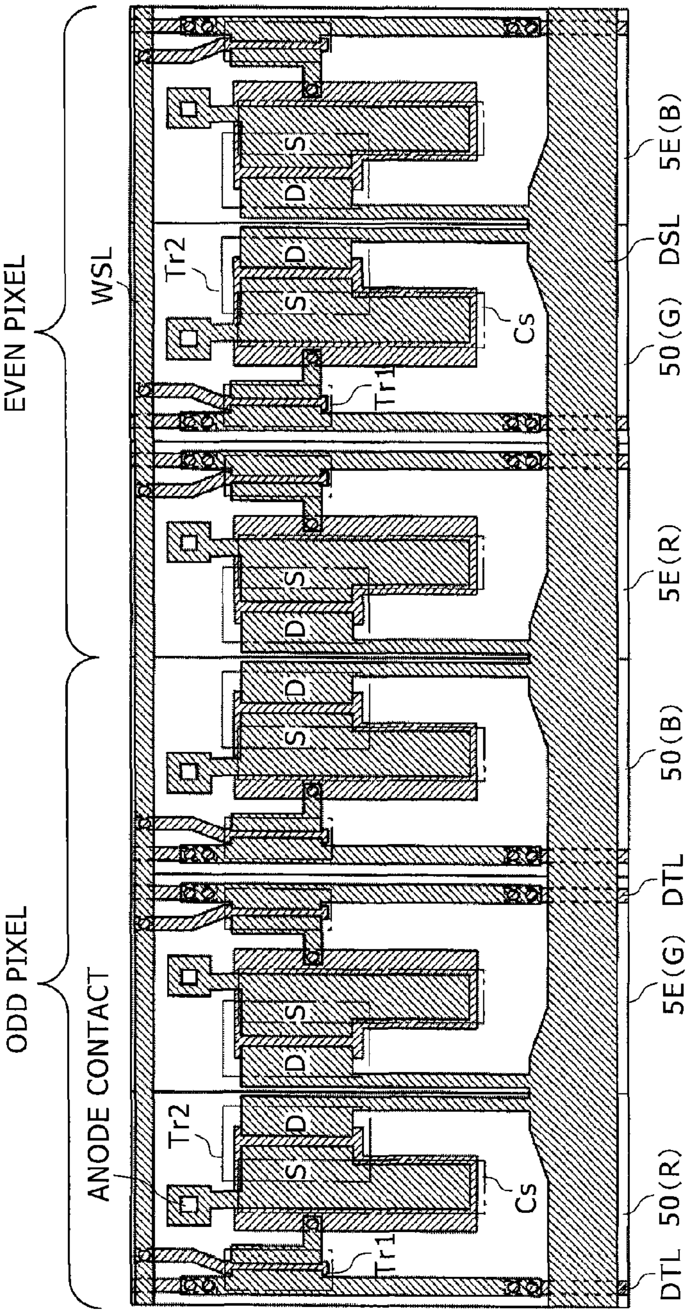
FIG. 18 is a plan view of an example in which the pixel circuit of FIG. 17 is arranged in axisymmetric form.

FIG. 1 is a block diagram showing an image display device according to a first embodiment of the present invention. This image display device 21 is formed in the same manner as the image display device 1 described with reference to FIG. 7 except for different configurations of a display section 22 and a signal line driving circuit 23. For the display section 22, masks for creating an odd-numbered pixel circuit 5O and an even-numbered pixel circuit 5E, respectively, from a left end are created by mirror inversion with a signal line DTL as an axis of symmetry. Thereby, as shown in FIG. 2 by contrast with FIG. 18, the odd-numbered pixel circuit 5O and the even-numbered pixel circuit 5E from the left end are created in axisymmetric form with respect to the signal line DTL. Further, in the display section 22, transistors Tr2 and the like are arranged such that the drains of driving transistors Tr2 in the odd-numbered pixel circuit 5O and the even-numbered pixel circuit 5E are adjacent to each other back to back by being created in such axisymmetric form. In the display section 22, the drains of the driving transistors Tr2 arranged back to back are connected to the scanning line DSL of a driving signal DS for power supply by a common wiring pattern.

Incidentally, the pixel circuits 5O and 5E are set such that the electrode of the source S of the driving transistor Tr2 is integral with the counter electrode of a storage capacitor Cs and thereby a sufficient capacitance of the storage capacitor Cs can be secured.

In the display section 22, as shown by an arrow A, the annealing process of transistors Tr1 and Tr2 is performed by irradiating the transistors Tr1 and Tr2 with a laser beam in order of raster scanning. Thus, in the display section 22, a laser beam irradiation starting position in the annealing process of the driving transistors Tr2 differs between the odd-numbered pixel circuit 5O and the even-numbered pixel circuit 5E from the left end, the pixel circuits 5O and 5E being adjacent to each other. More specifically, the order of irradiation of the source S and drain D of the driving transistor Tr2 with the laser beam is reversed between the odd-numbered pixel circuit 5O and the even-numbered pixel circuit 5E. That is, in the display section 22, the laser beam irradiation starts on the side of the source S in the odd-numbered pixel circuit 5O, and the laser beam irradiation starts on the side of the drain D in the even-numbered pixel circuit 5E.

In this case, because constituent members connected to the source S and the drain D differ between the pixel circuits 5O and 5E, and particularly because the electrode of the source S is integral with the counter electrode of the storage capacitor Cs in the present embodiment, when the laser beam irradiation starting position in the annealing process differs, temperature change in an amorphous silicon layer (temperature profile in the annealing process) differs between the odd-numbered pixel circuit 5O and the even-numbered pixel circuit 5E.

A result of various considerations shows that in the display section 22, the difference in temperature change changes the on characteristic of the driving transistor Tr2 and causes a significant change in mobility between the odd-numbered pixel circuit 5O and the even-numbered pixel circuit 5E. It is confirmed in the configuration and conditions of pixel circuits in a specific experiment that the even-numbered pixel circuit 5E where the laser beam irradiation starts on the side of the drain D is increased in mobility as compared with the odd-numbered pixel circuit 5O where the laser beam irradiation starts on the side of the source S.

The image display device 21 accordingly corrects the increase in mobility by the setting of voltage of a driving signal Ssig output to the signal line DTL. Specifically, the signal line driving circuit 23 (FIG. 1) outputs the driving signal Ssig for the signal line to the signal line DTL provided in the display section 22. The signal line driving circuit 23 changes the voltage of the driving signal Ssig by changing the gain of the driving signal Ssig between the odd-numbered pixel circuit 5O and the even-numbered pixel circuit 5E, and thereby corrects the characteristic of the driving transistor Tr2 which characteristic differs between the odd-numbered pixel circuit 5O and the even-numbered pixel circuit 5E.

Specifically, in the signal line driving circuit 23, a latch section 23A sequentially latches sequentially input image data D1 by a built-in latch circuit, and thereby distributes the image data D1 to signal lines DTL.

An odd-column digital-to-analog converter circuit 23BO is supplied with the image data D1 distributed to odd-numbered pixel circuits 5O, subjects the image data D1 to digital-to-analog conversion processing, and then outputs the result.

Specifically, in the odd-column digital-to-analog converter circuit 23BO, a reference voltage generating circuit 24 divides a predetermined original reference voltage VrefO by resistance to generate a plurality of reference voltages V0 to V63. Selectors (SEL) 25A, 25B, . . . subject the image data D1 to digital-to-analog conversion processing by respectively selecting the reference voltages V0 to V63 on the basis of the corresponding image data D1 output from the latch section 23A, and output gradation voltages Vin for the odd-numbered pixel circuits 5O.

As with the odd-column digital-to-analog converter circuit 23BO, an even-column digital-to-analog converter circuit (even-column DA) 23BE generates a plurality of reference voltages V0 to V63 by dividing a predetermined original reference voltage VrefE by resistance, and outputs gradation voltages Vin for even-numbered pixel circuits 5E by selective output of the reference voltages V0 to V63.

The signal line driving circuit 23 generates a gradation setting voltage Vsig by adding a fixed voltage Vofs for threshold voltage correction to each of the gradation voltages Vin for the odd-numbered pixel circuits 5O and the gradation voltages Vin for the even-numbered pixel circuits 5E. The signal line driving circuit 23 alternately outputs the gradation setting voltage Vsig and the fixed voltage Vofs to the corresponding signal line DTL.

For the signal line driving circuit 23, the original reference voltages VrefO and VrefE used to generate the gradation voltages Vin are set individually between the odd-numbered pixel circuits 5O and the even-numbered pixel circuits 5E, respectively. Thereby, the signal line driving circuit 23 individually sets the gain in the digital-to-analog conversion processing of the image data D1 between the odd-numbered pixel circuits 5O and the even-numbered pixel circuits 5E, and individually sets the voltage of the driving signal Ssig between the odd-numbered pixel circuits 5O and the even-numbered pixel circuits 5E.

More specifically, for the signal line driving circuit 23, the original reference voltage VrefE for the even-numbered pixel circuits 5E is set lower than the original reference voltage VrefO for the odd-numbered pixel circuits 5O by setting based on a measurement result obtained from a separately produced image display device 21 or by adjustment work after measurement of light emission luminance of the pixel circuits 5O and 5E in this image display device 21. Thereby the signal line driving circuit 23 sets the voltage of the driving signal Ssig for the even-numbered pixel circuit 5E where the laser beam irradiation starts on the side of the drain D lower voltage as compared with the odd-numbered pixel circuit 5O where the laser beam irradiation starts on the side of the source S. The signal line driving circuit 23 thus corrects the on characteristic of the driving transistor Tr2.

Operation of Embodiment

In the above configuration of the image display device 21 (FIG. 1), a writing transistor Tr1, a driving transistor Tr2, a storage capacitor Cs and the like forming each of the pixel circuits 5O and 5E are created on an insulating substrate such as a glass substrate or the like, and thereafter an organic EL element 8 is disposed. Thereby the display section 22 is formed on the insulating substrate. The image display device 21 is thereafter provided with the signal line driving circuit 23 and a scanning line driving circuit 4 on the periphery of the display section 22.

In the image display device 21 (FIG. 2), in creating the writing transistor Tr1, the driving transistor Tr2, the storage capacitor Cs and the like, an odd-numbered pixel circuit 5O and an even-numbered pixel circuit 5E from a left end in an extending direction of scanning lines DSL and WSL are created in axisymmetric form with a signal line DTL as an axis of symmetry. In addition, the drain D of the driving transistor Tr2 and a wiring pattern for connecting the drain D to a scanning line DSL for power supply are made common to the odd-numbered pixel circuit 5O and the even-numbered pixel circuit 5E adjacent to each other. Thereby, in the image display device 21, the layout of each of the pixel circuits 5O and 5E is simplified, a sufficient area can be allocated to the storage capacitor Cs, and a yield can be improved.

However, when the pixel circuits 5O and 5E are created in axisymmetric form, a starting position of irradiation of the driving transistor Tr2 with a laser beam differs between the odd-numbered pixel circuit 5O and the even-numbered pixel circuit 5E in the annealing process of the driving transistor Tr2. Specifically, the laser beam irradiation starts on the side of the source S in the odd-numbered pixel circuit 5O, and the laser beam irradiation starts on the side of the drain D in the even-numbered pixel circuit 5E. As a result, temperature change at the time of the annealing process differs and the on characteristic of the driving transistor Tr2 differs between the odd-numbered pixel circuit 5O and the even-numbered pixel circuit 5E. When no measure is taken, the difference in the on characteristic causes luminance nonuniformity of fine vertical stripes on the display screen of the image display device 21.

Accordingly, in the present embodiment, the on characteristic of the driving transistor Tr2 is corrected by the setting of voltage of the driving signal Ssig for the signal line DTL which signal is output from the signal line driving circuit 23. Thereby the image display device 21 corrects variations in the characteristic of the driving transistor due to the layout of pixel circuits.

That is, because this kind of difference in the on characteristic is principally a difference in mobility of the driving transistor Tr2, a decrease in light emission luminance due to a decrease in mobility can be corrected by raising the voltage of the driving signal Ssig in the pixel circuit 5O having low mobility. Thereby variations in the characteristic of the driving transistor due to the layout of pixel circuits can be corrected.

Specifically, in the image display device 21 (FIG. 2 and FIG. 3), the signal line driving circuit 23 distributes sequentially input image data D1 to the signal lines DTL. In the image display device 21, the odd-column digital-to-analog converter circuit 23BO and the even-column digital-to-analog converter circuit 23BE generate the reference voltages V0 to V63 by dividing the original reference voltages VrefO and VrefE, respectively, by resistance. In the image display device 21, the reference voltages V0 to V63 are selected on the basis of the image data D1 distributed to odd columns and even columns, image data corresponding to each signal line DTL is subjected to analog-to-digital conversion processing, and gradation voltages Vin are generated. In the image display device 21, the driving signal Ssig for the signal line DTL is generated on the basis of the gradation voltage Vin.

In the image display device 21, the original reference voltages VrefO and VrefE are set individually between the odd-column digital-to-analog converter circuit 23BO and the even-column digital-to-analog converter circuit 23BE. Thereby the voltage of the driving signal Ssig is set by changing the gain of the driving signal Ssig between the odd-numbered pixel circuit 5O and the even-numbered pixel circuit 5E.

Figures 8A, 8B, 8C, 8D, 8E:
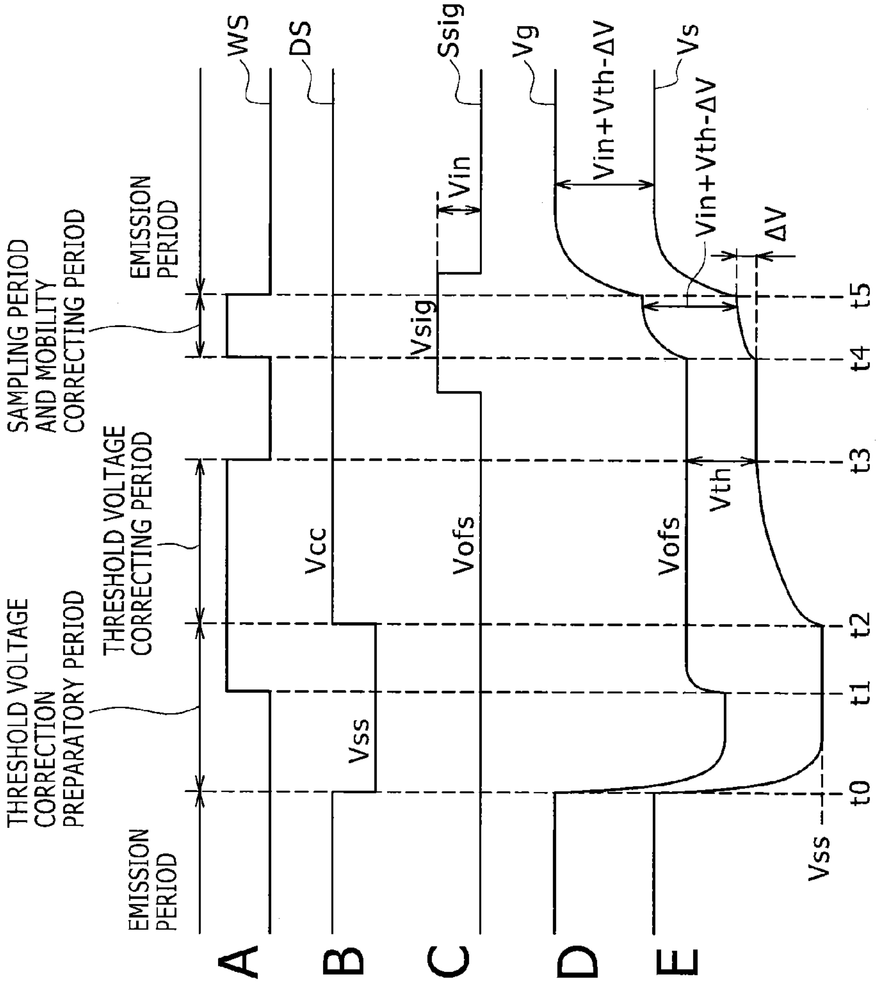
FIG.8E RELATED ART
FIGS. 8A, 8B, 8C, 8D, and 8E are time charts of assistance in explaining the operation of the image display device of FIG. 6.
Figure 9:
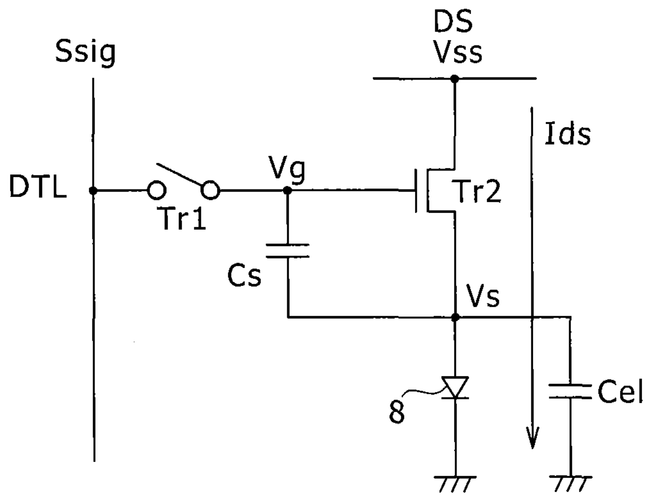
FIG. 9 is a connection diagram of assistance in explaining the operation of the image display device of FIG. 6.
Figure 10:
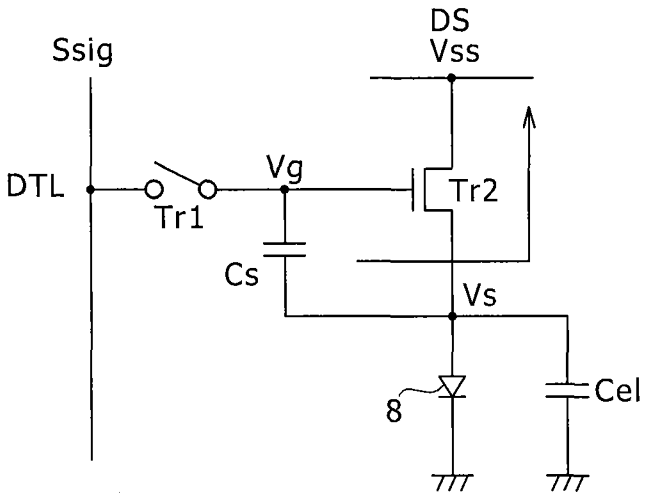
RELATED ART FIG.10
FIG. 10 is a connection diagram of assistance in explaining a continuation of FIG. 9.
Figure 11:
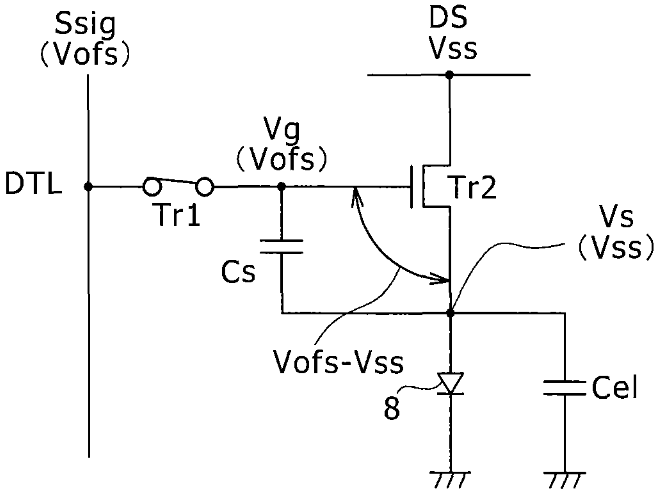
FIG. 11 is a connection diagram of assistance in explaining a continuation of FIG. 10.
Figure 12:
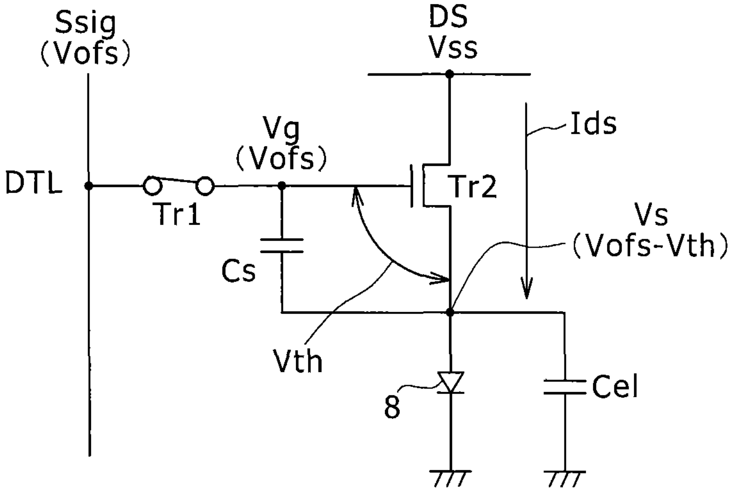
RELATED ART FIG.12
FIG. 12 is a connection diagram of assistance in explaining a continuation of FIG. 11.
Figure 13:
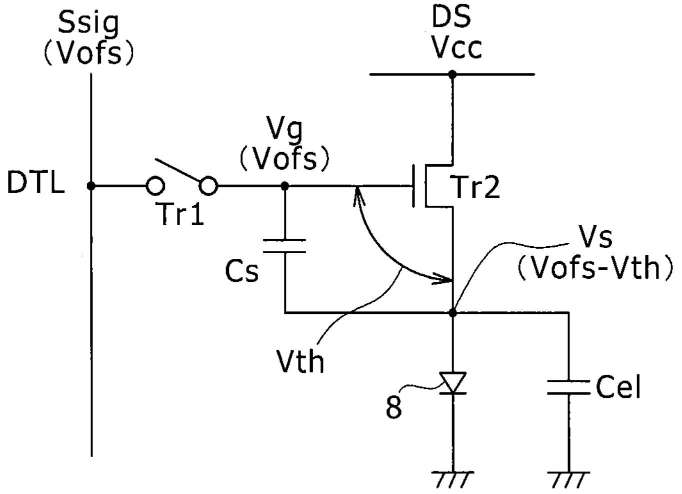
FIG. 13 is a connection diagram of assistance in explaining a continuation of FIG. 12.
Figure 14:
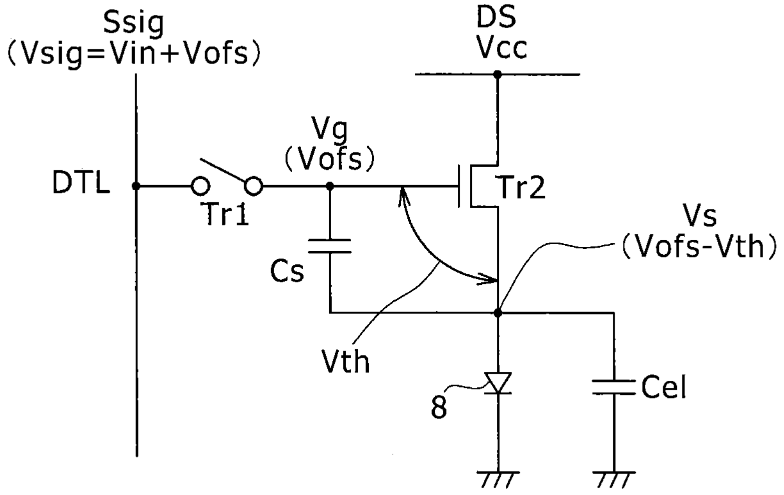
RELATED ART FIG. 14
FIG. 14 is a connection diagram of assistance in explaining a continuation of FIG. 13.
Figure 15:
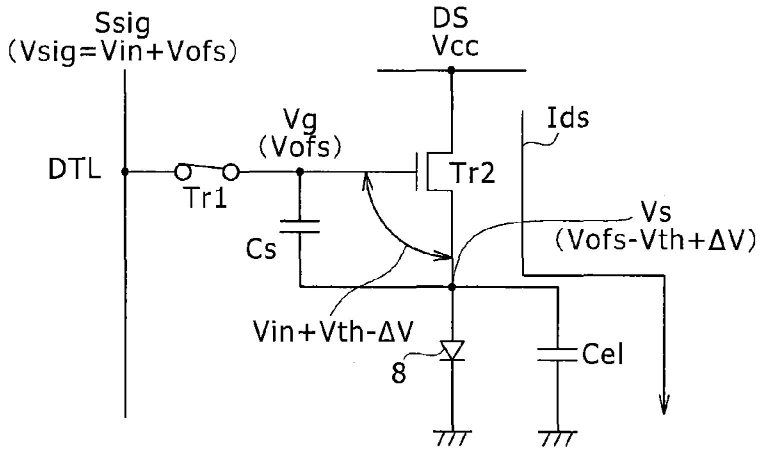
FIG. 15 is a connection diagram of assistance in explaining a continuation of FIG. 14.
Figure 16:
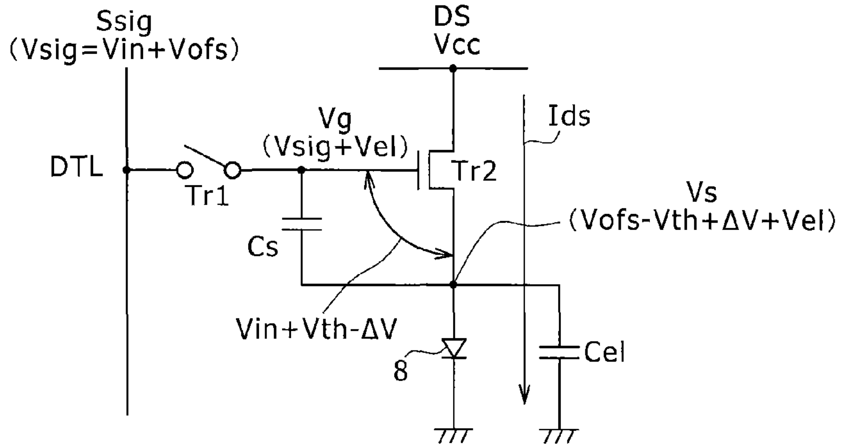
RELATED ART FIG. 16
FIG. 16 is a connection diagram of assistance in explaining a continuation of FIG. 15.
Figure 17:
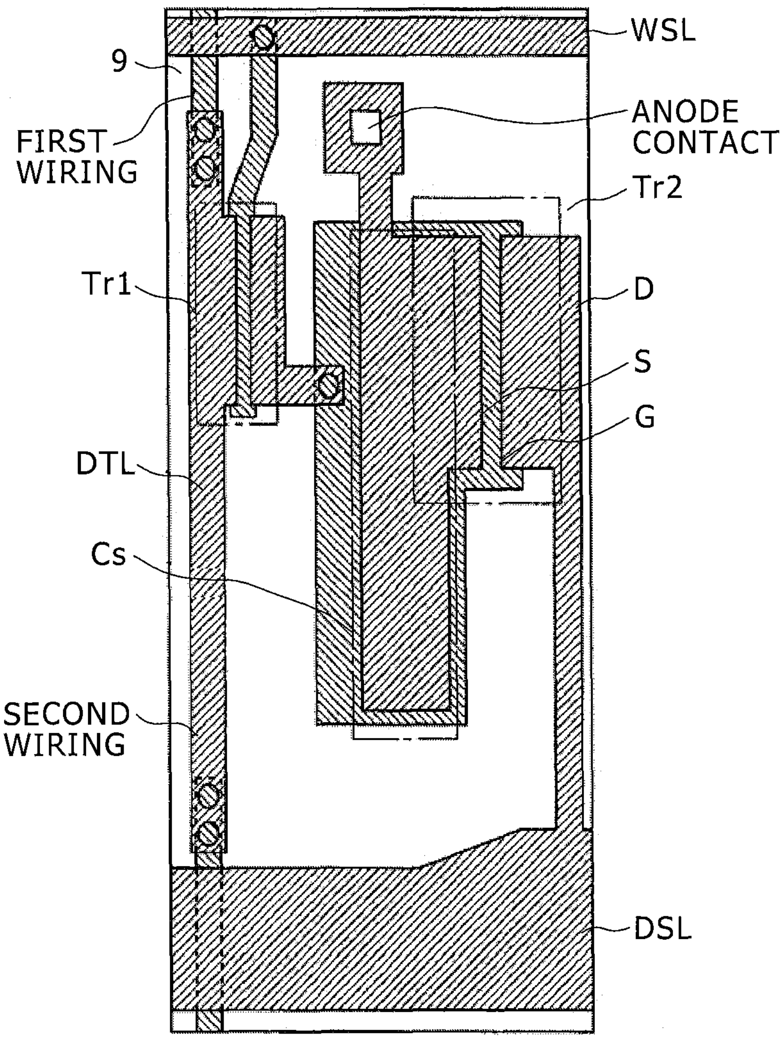
FIG. 17 is a plan view of a configuration of a pixel circuit applied to the image display device of FIG. 7.

In the image display device 21, the gradation of each of the pixel circuits 5O and 5E is set by the driving signal Ssig. More specifically, in the pixel circuits 5O and 5E (FIG. 7 and FIG. 8), the organic EL element 8 is current-driven by the driving transistor Tr2 of a source-follower circuit configuration, and the voltage of a gate side terminal of the storage capacitor Cs provided between the gate and the source of the driving transistor Tr2 is set at the voltage of the signal line DTL. Thereby the image display device 21 can correct variations in the characteristic of the driving transistor Tr2 due to the layout of the pixel circuits 5O and 5E, and display an image of high image quality.

However, the driving transistor Tr2 applied to these pixel circuits 5O and 5E has a disadvantage of large variation in threshold voltage Vth to begin with. Consequently, in the image display device 21, when the voltage of the gate side terminal of the storage capacitor Cs is simply set to the voltage Vin corresponding to the light emission luminance of the light emitting element 8, the light emission luminance of the organic EL element 8 varies due to the variation in threshold voltage Vth of the driving transistor Tr2, thus degrading image quality.

Accordingly, in the image display device 21, the voltage on the organic EL element 8 side of the storage capacitor Cs is lowered by lowering the driving signal DS for power supply in advance. Thereafter the gate voltage of the driving transistor Tr2 is set to the fixed voltage Vofs for threshold voltage correction via the writing transistor Tr1. Thereby, in the image display device 21, a voltage across the storage capacitor Cs is set larger than the threshold voltage Vth of the driving transistor Tr2. In addition, the voltage across the storage capacitor Cs is discharged via the driving transistor Tr2. As a result of the series of processes, the image display device 21 sets the voltage across the storage capacitor Cs to the threshold voltage Vth of the driving transistor Tr2 in advance.

Thereafter, the image display device 21 sets the gradation setting voltage Vsig obtained by adding the fixed voltage Vofs to the gradation voltage Vin as the gate voltage of the driving transistor Tr2. Thereby the image display device 21 can prevent degradation in image quality due to variations in the threshold voltage Vth of the driving transistor Tr2.

In addition, by maintaining the gate voltage of the driving transistor Tr2 at the gradation setting voltage Vsig in a state of power being supplied to the driving transistor Tr2 for a certain period, degradation in image quality due to variations in mobility of the driving transistor Tr2 can be prevented.

In particular, in the present embodiment, correction is made by setting the voltage of the driving signal Ssig for the signal line between the odd-numbered pixel circuit 5O and the even-numbered pixel circuit 5E, and further the mobility of the driving transistor Tr2 is corrected at the time of gradation setting in each of the pixel circuits 5O and 5E, whereby variations in mobility of the driving transistor Tr2 can be corrected with particularly high accuracy. Thus, an image can be displayed with much higher image quality than related arts.

Effect of Embodiment

According to the above constitution, pixel circuits adjacent to each other are created in axisymmetric form, and a difference in the on characteristic of the driving transistor which difference is caused by difference in the starting position of irradiation of the driving transistor with a laser beam between the pixel circuits adjacent to each other is corrected by the setting of voltage of the driving signal for the signal line, so that variations in characteristic of the driving transistor due to the layout of the pixel circuits can be corrected.

More specifically, by changing the setting of voltage of the driving signal for the signal line between the odd-numbered pixel circuit and the even-numbered pixel circuit from one end of the scanning lines, when the pixel circuits are formed in axisymmetric form with the signal line set as axis of symmetry, variations in characteristic of the driving transistor due to the layout of the pixel circuits can be corrected.

In addition, by changing the setting of the voltage by changing the gain of the driving signal, variations in characteristic of the driving transistor due to the layout of the pixel circuits can be corrected specifically.

Further, an emission period and a non-emission period are repeated alternately. In the non-emission period, the voltage across the storage capacitor is set to a voltage more than the threshold voltage of the driving transistor, the voltage across the storage capacitor is set to a voltage corresponding to the threshold voltage of the driving transistor by discharge via the driving transistor, and a terminal voltage of the storage capacitor is set to the voltage of the signal line to set the light emission luminance of the light emitting element in the following emission period. It is thereby possible to effectively avoid degradation in image quality due to variations of the driving transistor, and display an image of high image quality.

Further, variation in mobility of the driving transistor is corrected by setting the writing transistor in an on state for a certain period and thus setting the terminal voltage of the storage capacitor to the voltage of the signal line. It is thereby possible to correct variations in mobility with much higher accuracy, and display an image of high image quality.

Further, by setting the voltage across the storage capacitor to a voltage more than the threshold voltage of the driving transistor by the setting of the voltages of the driving signal for power supply of the driving transistor and the signal line, it is possible to form pixel circuits with a simple configuration, and display an image of high image quality.

Second Embodiment

Figure 3:
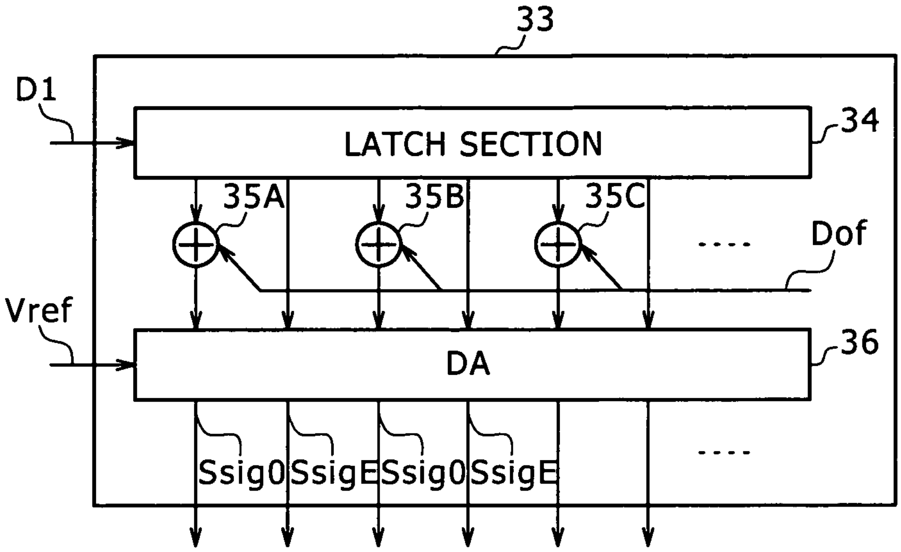
FIG. 3 is a block diagram showing a signal line driving circuit applied to an image display device according to a second embodiment of the present invention.

FIG. 3 is a block diagram showing a signal line driving circuit applied to an image display device according to a second embodiment of the present invention. The image display device according to the present embodiment is formed in the same manner as the image display device according to the first embodiment except that a signal line driving circuit 33 shown in FIG. 3 is applied to the image display device according to the present embodiment in place of the signal line driving circuit 23.

In the signal line driving circuit 33, a latch section 34 sequentially latches sequentially input image data D1 by a built-in latch circuit, and thereby distributes the image data D1 to signal lines DTL. Adding circuits 35A, 35B, 35C, . . . add offset data Dof to the image data D1 distributed to odd-numbered pixel circuits 5O by the latch section 34, and output the result. A digital-to-analog converter circuit 36 divides a predetermined original reference voltage Vref by resistance to generate a plurality of reference voltages. The digital-to-analog converter circuit 36 selects and outputs the plurality of reference voltages on the basis of the image data output from the adding circuits 35A, 35B, 35C, . . . and image data D1 distributed to even-numbered pixel circuits 5E by the latch section 34. The digital-to-analog converter circuit 36 thereby subjects the image data output from the adding circuits 35A, 35B, 35C, . . . and the image data D1 distributed to the even-numbered pixel circuits 5E by the latch section 34 to analog-to-digital conversion processing, and outputs gradation voltages Vin. The signal line driving circuit 33 generates gradation setting voltages Vsig by adding a fixed voltage Vofs for threshold voltage correction to the gradation voltages Vin output from the digital-to-analog converter circuit 36. The signal line driving circuit 33 outputs driving signals Ssig for the respective signal lines DTL by alternately selecting the gradation setting voltages Vsig and the fixed voltage Vofs for threshold voltage correction.

According to the present embodiment, similar effects to those of the first embodiment can be obtained even when the gain of the driving signals Ssig is changed and the voltage of the driving signals Ssig is set by adding the image data D1.

Third Embodiment

Figure 4:
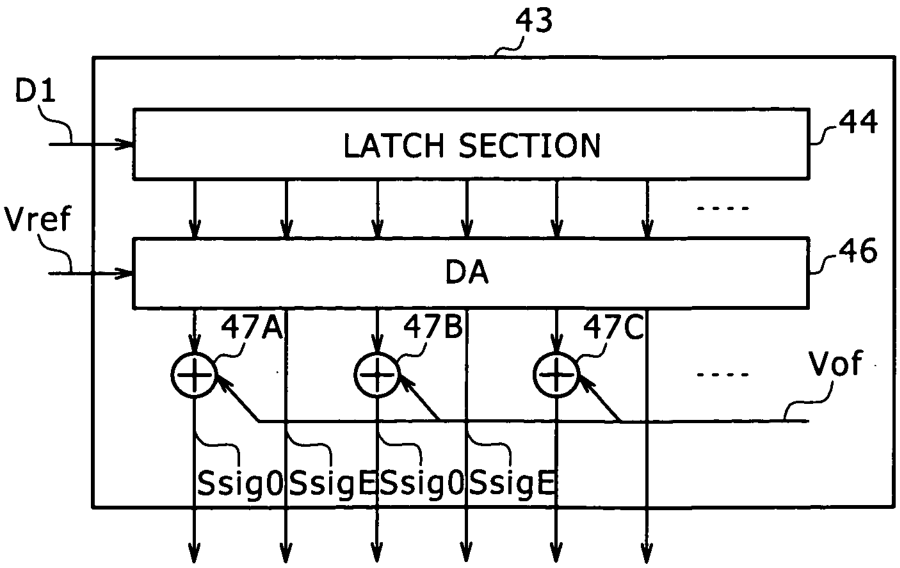
FIG. 4 is a block diagram showing a signal line driving circuit applied to an image display device according to a third embodiment of the present invention.

FIG. 4 is a block diagram showing a signal line driving circuit applied to an image display device according to a third embodiment of the present invention. The image display device according to the present embodiment is formed in the same manner as the image display device according to the first embodiment except that a signal line driving circuit 43 shown in FIG. 4 is applied to the image display device according to the present embodiment in place of the signal line driving circuit 23.

In the signal line driving circuit 43, a latch section 44 sequentially latches sequentially input image data D1 by a built-in latch circuit, and thereby distributes the image data D1 to signal lines DTL. A digital-to-analog converter circuit 46 divides a predetermined original reference voltage Vref by resistance to generate a plurality of reference voltages. The digital-to-analog converter circuit 46 selects and outputs the plurality of reference voltages according to the image data D1 distributed by the latch section 44. The digital-to-analog converter circuit 46 thereby subjects the image data D1 distributed to each signal line DTL to analog-to-digital conversion processing, and outputs gradation voltages Vin.

Adding circuits 47A, 47B, 47C, . . . add an offset voltage Vof to the gradation voltages Vin distributed to odd-numbered pixel circuits 5O from the gradation voltages Vin output from the digital-to-analog converter circuit 46, and output the result. The offset voltage Vof in this case is a voltage for correcting light emission luminance that differs between an odd-numbered pixel circuit 5O and an even-numbered pixel circuit 5E when each of the pixel circuits 5E and 5O is driven at a luminance level of 50[%], for example.

The signal line driving circuit 43 generates gradation setting voltages Vsig by adding a fixed voltage Vofs for threshold voltage correction to the gradation voltages Vin for the odd-numbered pixel circuits 5O which voltages are output from the adding circuits 47A, 47B, 47C, . . . and the gradation voltages Vin for even-numbered pixel circuits 5E which voltages are output from the digital-to-analog converter circuit 36. The signal line driving circuit 43 outputs driving signals Ssig for the respective signal lines DTL by alternately selecting the gradation setting voltages Vsig and the fixed voltage Vofs for threshold voltage correction.

According to the present embodiment, similar effects to those of the first embodiment can be obtained even when the voltage of the driving signals Ssig is set by adding the offset voltage. In addition, in this case, a configuration that corrects variation in mobility of the driving transistor by setting the writing transistor in an on state for a certain period and thereby setting the terminal voltage of the storage capacitor to the voltage of the signal line can be used effectively to correct variations in characteristic of the driving transistor due to the layout of the pixel circuits.

Fourth Embodiment

Figure 5:
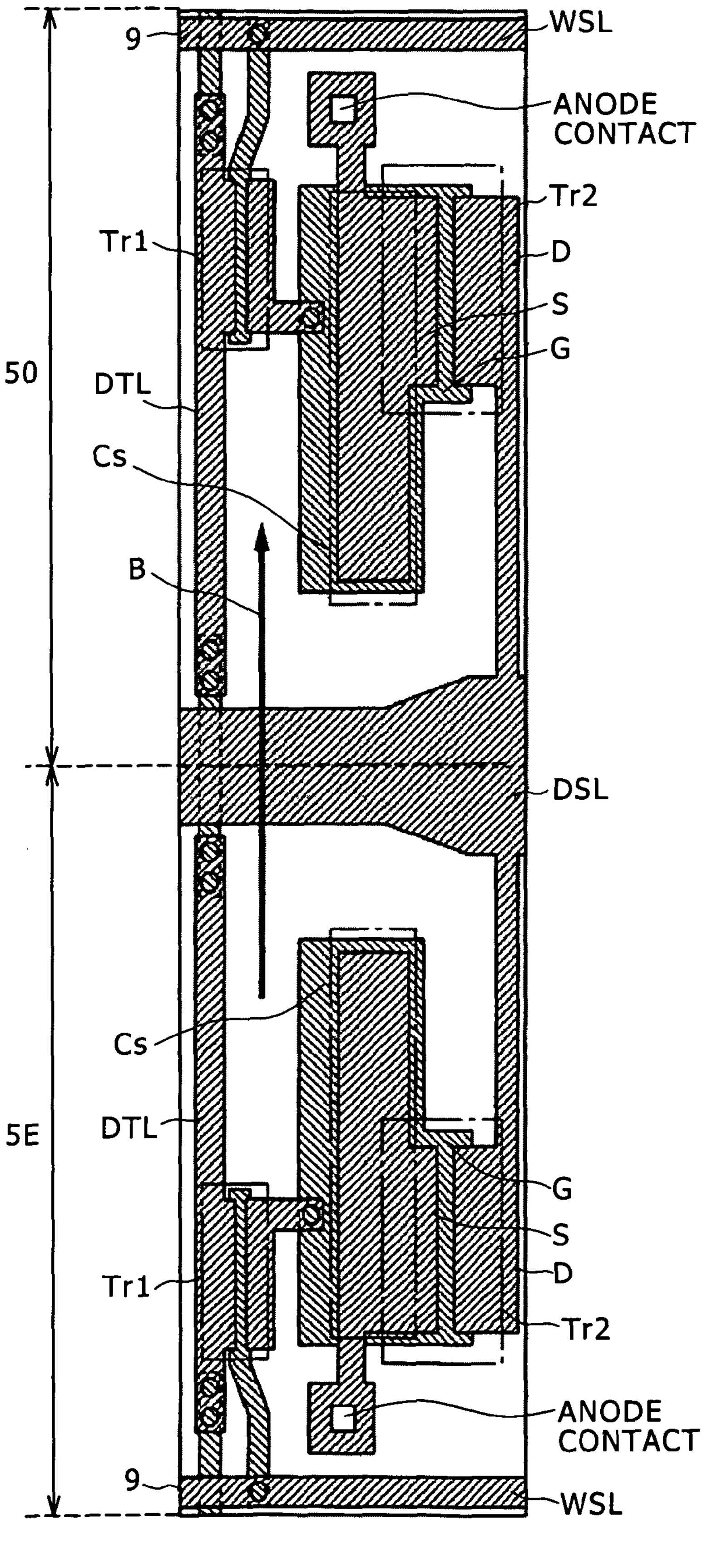
FIG. 5 is a plan view of a constitution of a display section in an image display device according to a fourth embodiment of the present invention.
Figure 6:
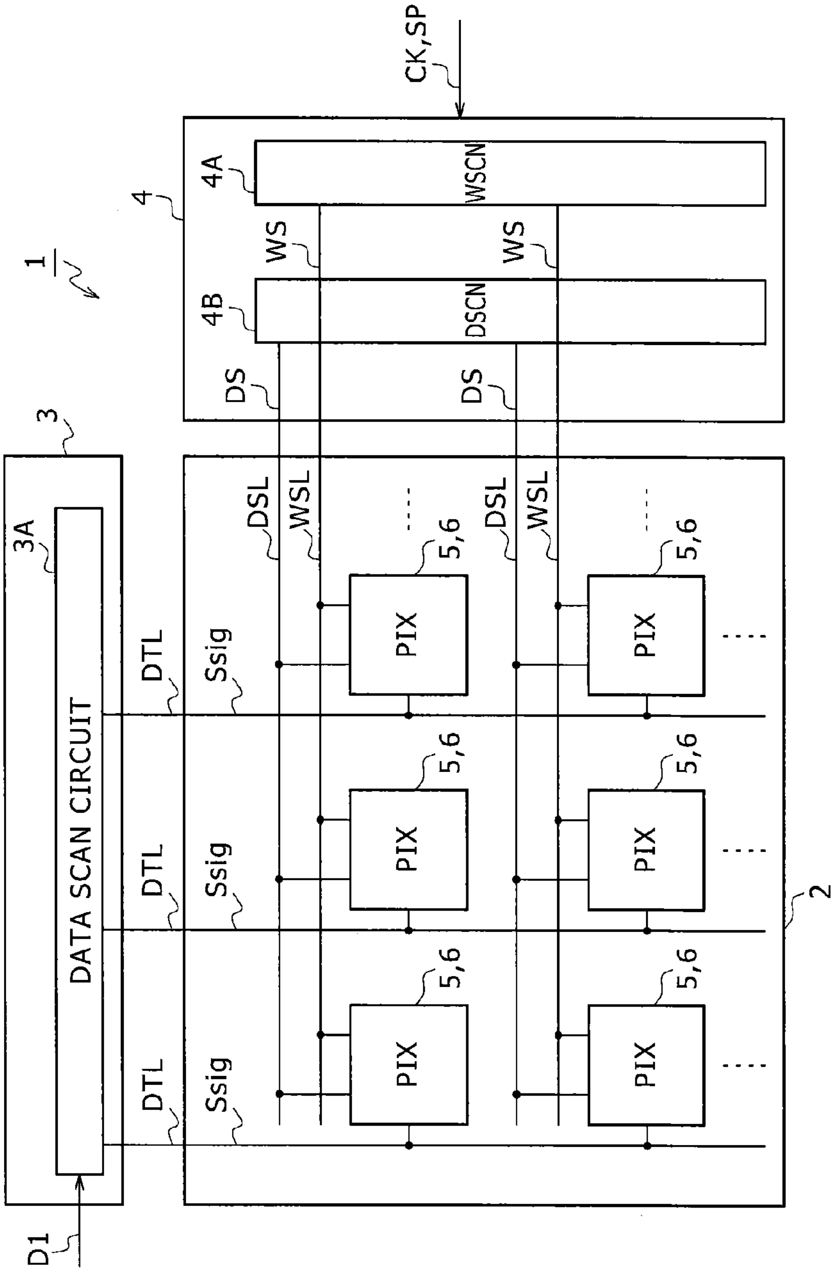
FIG. 6 is a block diagram showing an image display device in the related art.

FIG. 5 is a plan view of the layout of pixel circuits applied to an image display device according to a fourth embodiment of the present invention. In the image display device according to the present embodiment, a scanning line DSL of a driving signal DS for power supply which scanning line is common to a pixel circuit 5O in an odd line and a pixel circuit 5E in an even line is provided between the pixel circuits 5O and 5E in the odd line and the even line. Thereby, in the image display device according to the present embodiment, each pixel circuit is driven by a so-called unit drive, in which the driving of pixel circuits provided in a display section is made common to a plurality of consecutive lines.

Incidentally, in the present embodiment, the scanning line DSL is made common to the pixel circuit 5O in the odd line and the pixel circuit 5E in the following even line, and thereby the driving signal DS for power supply is made common to the pixel circuit 5O in the odd line and the pixel circuit 5E in the following even line. Thus, the drain voltages of driving transistors Tr2 in the pixel circuits 5O and 5E in the two lines are simultaneously lowered to a voltage Vss, and the pixel circuits 5O and 5E in the two lines simultaneously start a non-emission period. However, instead of this, the non-emission period may be started in each line by setting a quenching voltage in the storage capacitor Cs via a signal line STL and setting the voltage across the storage capacitor Cs to less than the threshold voltage Vth of the driving transistor Tr2. This allows the number of lines to which the driving signal DS for power supply is made common to be increased freely.

In this image display device, the pixel circuits 5O and SE to which the scanning line DSL is made common are created in axisymmetric form with the scanning line as an axis of symmetry. As indicated by a reference character B, an annealing process is performed by sequentially scanning a laser beam in an extending direction of the signal line DTL. Thereby, also in the present embodiment, a starting position of irradiation of the driving transistor Tr2 with the laser beam differs between the pixel circuits 5O and 5E adjacent to each other, and this difference causes a difference in the on characteristic of the driving transistor Tr2 between the pixel circuit 5O in the odd line and the pixel circuit 5E in the even line.

Thus, in the present embodiment, the difference in the on characteristic of the driving transistor Tr2 is corrected by one of the constitutions disclosed in the foregoing first to third embodiments. More specifically, in the present embodiment, variations in characteristic of the driving transistor due to the layout of the pixel circuits are corrected by changing the gain of driving signals Ssig output to respective signal lines DTL or an offset voltage on a time-division basis.

Similar effects to those of the foregoing embodiments can be obtained even when a pixel circuit 5O in an odd line and a pixel circuit 5E in an even line are created in axisymmetric form with a scanning line as an axis of symmetry as in the present embodiment.

Examples of Modification

It is to be noted that while in the foregoing first and second embodiments, description has been made of a case where the gain of driving signals is changed and the voltage of the driving signals is set by the setting of original reference voltage and the addition of offset data, the present invention is not limited to this. The same effects as those of the foregoing first and second embodiments can be obtained by applying various constitutions that change the gain of the driving signals, such as a case where the gain of the driving signals is changed and the voltage of the driving signals is set by the setting of gain of a buffer circuit outputting gradation voltages Vin, for example.

In addition, in the foregoing embodiments, description has been made of a case where gradation voltages Vin obtained by subjecting image data to digital-to-analog conversion processing are corrected, and the voltage of the driving signals is set. However, the present invention is not limited to this. When a practically sufficient characteristic can be secured, the voltage of the driving signals may be set by the setting of the fixed voltage Vofs, the setting of the driving signals Ssig, and the like.

In addition, in the foregoing embodiments, description has been made of a case where driving transistors Tr2 are arranged such that gate electrodes extend in an extending direction of signal lines, and pixel circuits are set in axisymmetric form with a scanning line or a signal line set as an axis of symmetry. However, the present invention is not limited to this. The present invention is widely applicable to cases where driving transistors Tr2 are arranged such that gate electrodes extend in an extending direction of scanning lines, and pixel circuits are set in axisymmetric form with a scanning line or a signal line set as an axis of symmetry.

In addition, in the foregoing embodiments, description has been made of a case where pixel circuits are set in axisymmetric form with a scanning line or a signal line set as an axis of symmetry. However, the present invention is not limited to this. The present invention is widely applicable to cases where pixel circuits are set in axisymmetric form with a scanning line and a signal line set as an axis of symmetry, that is, cases where pixel circuits formed in axisymmetric form with a scanning line set as an axis of symmetry are further arranged in symmetric form with a signal line set as an axis of symmetry.

In addition, in the foregoing embodiments, description has been made of a case where the voltage across the storage capacitor is set to a voltage more than the threshold voltage of the driving transistor Tr2 by setting the voltage of the gate side terminal of the storage capacitor to the voltage Vofs via a signal line. However, the present invention is not limited to this. The present invention is widely applicable to cases where a separate transistor is provided and the voltage of the gate side terminal of the storage capacitor is set to the voltage Vofs via this transistor, for example.

In addition, in the foregoing embodiments, description has been made of a case where the voltage across the storage capacitor is discharged via the driving transistor in one period. However, the present invention is not limited to this. The present invention is widely applicable to cases where the discharging process is performed in a plurality of periods.

In addition, in the foregoing embodiments, description has been made of a case where an N-channel type transistor is applied as the driving transistor. However, the present invention is not limited to this. The present invention is widely applicable to image display devices in which a P-channel type transistor is applied as the driving transistor and the like.

In addition, in the foregoing embodiments, description has been made of a case where the present invention is applied to an image display device using organic EL elements. However, the present invention is not limited to this. The present invention is widely applicable to image display devices using various self-luminous elements of a current-driven type.

The present invention is applicable to an active matrix type image display device using organic EL elements, for example.

The present application contains subject matter related to that disclosed in Japanese Priority Patent Application JP 2008-213512 filed in the Japan Patent Office on Aug. 22, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image display device comprising:

a display section formed by arranging pixel circuits in a form of a matrix;

a signal line driving circuit configured to output a driving signal for a signal line to the signal line of said display section; and a scanning line driving circuit configured to output a driving signal for a scanning line to the scanning line of said display section;

wherein said pixel circuits each include at least a light emitting element, a driving transistor configured to drive said light emitting element connected to a source by a driving current corresponding to a gate-to-source voltage, a storage capacitor configured to retain said gate-to-source voltage, and a writing transistor configured to set a terminal voltage of said storage capacitor by a voltage of the signal line, at least said driving transistor is created by being subjected to an annealing process by irradiation with a laser beam;

in said display section, adjacent pixel circuits of said pixel circuits are created in axisymmetric form with respect to the scanning line and/or the signal line; and said signal line driving circuit changes a setting of a voltage of the driving signal for said signal line between said adjacent pixel circuits, wherein said adjacent pixel circuits are an odd-numbered pixel circuit and an even-numbered pixel circuit as determined from one end of said scanning line, and said signal line driving circuit changes the setting of the voltage of the driving signal for said signal line between a signal line of said odd-numbered pixel circuit and a signal line of said even-numbered pixel circuit, and wherein said pixel circuits alternately repeat an emission period for making said light emitting element emit light and a non-emission period for stopping light emission of said light emitting element and setting light emission luminance of said light emitting element in a following emission period, in said non-emission period, said pixel circuits set a voltage across said storage capacitor to a voltage more than a threshold voltage of said driving transistor, and set the voltage across said storage capacitor to a voltage corresponding to the threshold voltage of said driving transistor by discharging the voltage across said storage capacitor via said driving transistor, and said pixel circuits next set a terminal voltage of said storage capacitor to a voltage of said signal line to set the light emission luminance of said light emitting element in said following emission period.

2. The image display device according to claim 1, wherein to change the setting of the voltage of the driving signal for said signal line is to change a gain of said driving signal.

3. The image display device according to claim 1, wherein to change the setting of the voltage of the driving signal for said signal line is to change an offset voltage of said driving signal.

4. The image display device according to claim 1, wherein said pixel circuits correct variation in mobility of said driving transistor and set the light emission luminance of said light emitting element in the following said emission period by setting the terminal voltage of said storage capacitor to the voltage of said signal line by setting said writing transistor in an on state for a certain period.

5. The image display device according to claim 4, wherein said pixel circuits set a source voltage of said driving transistor by a setting of a driving signal for power supply to said driving transistor, and set the voltage across said storage capacitor to the voltage more than the threshold voltage of said driving transistor by setting the terminal voltage of said storage capacitor via said signal line.

6. A driving method of an image display device, said image display device including a display section formed by arranging pixel circuits in a form of a matrix, a signal line driving circuit configured to output a driving signal for a signal line to the signal line of said display section, and a scanning line driving circuit configured to output a driving signal for a scanning line to the scanning line of said display section, said pixel circuits each including at least a light emitting element, a driving transistor configured to drive said light emitting element connected to a source by a driving current corresponding to a gate-to-source voltage, a storage capacitor configured to retain said gate-to-source voltage, and a writing transistor configured to set a terminal voltage of said storage capacitor by a voltage of the signal line, at least said driving transistor being created by being subjected to an annealing process by irradiation with a laser beam, and in said display section, adjacent pixel circuits of said pixel circuits being created in axisymmetric form with respect to the scanning line and/or the signal line, the driving method of said image display device comprising:

changing, by said signal line driving circuit, a setting of a voltage of the driving signal for said signal line between said adjacent pixel circuits, wherein said adjacent pixel circuits are an odd-numbered pixel circuit and an even-numbered pixel circuit as determined from one end of said scanning line, and said signal line driving circuit changes the setting of the voltage of the driving signal for said signal line between a signal line of said odd-numbered pixel circuit and a signal line of said even-numbered pixel circuit; and alternately repeating, by said pixel circuits, an emission period for making said light emitting element emit light and a non-emission period for stopping light emission of said light emitting element and setting light emission luminance of said light emitting element in a following emission period, wherein in said non-emission period, said pixel circuits set a voltage across said storage capacitor to a voltage more than a threshold voltage of said driving transistor, and set the voltage across said storage capacitor to a voltage corresponding to the threshold voltage of said driving transistor by discharging the voltage across said storage capacitor via said driving transistor, and said pixel circuits next set a terminal voltage of said storage capacitor to a voltage of said signal line to set the light emission luminance of said light emitting element in said following emission period.

7. The method according to claim 6, wherein to change the setting of the voltage of the driving signal for said signal line is to change a gain of said driving signal.

8. The method according to claim 6, wherein to change the setting of the voltage of the driving signal for said signal line is to change an offset voltage of said driving signal.

9. The method according to claim 6, wherein said pixel circuits correct variation in mobility of said driving transistor and set the light emission luminance of said light emitting element in the following said emission period by setting the terminal voltage of said storage capacitor to the voltage of said signal line by setting said writing transistor in an on state for a certain period.

10. An image display device comprising:

a display section formed by arranging pixel circuits in a form of a matrix;

a signal line driving circuit configured to output a driving signal for a signal line to the signal line of said display section; and a scanning line driving circuit configured to output a driving signal for a scanning line to the scanning line of said display section;

wherein said signal line driving circuit includes a first digital-to-analog converter circuit corresponding to a first reference voltage, and a second digital-to-analog converter circuit corresponding to a second reference voltage;

said pixel circuits each include at least a light emitting element, and a driving transistor configured to drive said light emitting element; and in an adjacent pixel circuit adjacent to a said pixel circuit and having a driving transistor whose source and drain are disposed in an orientation different from an orientation of the driving transistor of said pixel circuit, a signal line corresponding to an output of said first digital-to-analog converter circuit is connected to said pixel circuit, and a signal line corresponding to an output of said second digital-to-analog converter circuit is connected to said adjacent pixel circuit wherein said pixel circuits alternately repeat an emission period for making said light emitting element emit light and a non-emission period for stopping light emission of said light emitting element and setting light emission luminance of said light element in a following emission period, in said non-emission period, said pixel circuits set a voltage across said storage capacitor to a voltage more than a threshold voltage of said driving transistor, and set the voltage across said storage capacitor to a voltage corresponding to the threshold voltage of said driving transistor by discharging the voltage across said storage capacitor via said driving transistor, and said pixel circuits next set a terminal voltage of said storage capacitor to a voltage of said signal line to set the light emission luminance of said light emitting element in said following emission period.

11. The image display device according to claim 10, wherein to change the setting of the voltage of the driving signal for said signal line is to change a gain of said driving signal.

12. The image display device according to claim 10, wherein to change the setting of the voltage of the driving signal for said signal line is to change an offset voltage of said driving signal.

13. The image display device according to claim 10, wherein said pixel circuits correct variation in mobility of said driving transistor and set the light emission luminance of said light emitting element in the following said emission period by setting the terminal voltage of said storage capacitor to the voltage of said signal line by setting said writing transistor in an on state for a certain period.

14. A driving method of an image display device, said image display device including a display section formed by arranging pixel circuits in a form of a matrix, a signal line driving circuit configured to output a driving signal for a signal line to the signal line of said display section, and a scanning line driving circuit configured to output a driving signal for a scanning line to the scanning line of said display section, wherein said signal line driving circuit includes a first digital-to-analog converter circuit corresponding to a first reference voltage, and a second digital-to-analog converter circuit corresponding to a second reference voltage, said pixel circuits each include at least a light emitting element, and a driving transistor configured to drive said light emitting element, and in an adjacent pixel circuit adjacent to a said pixel circuit and having a driving transistor whose source and drain are disposed in an orientation different from an orientation of the driving transistor of said pixel circuit, a signal line corresponding to an output of said first digital-to-analog converter circuit is connected to said pixel circuit, and a signal line corresponding to an output of said second digital-to-analog converter circuit is connected to said adjacent pixel circuit, the method comprising:

alternately repeating, by said pixel circuits, an emission period for making said ht emitting element emit light and a non-emission period for stopping light emission of said light emitting element and setting light emission luminance of said light emitting element in a following emission period, wherein in said non-emission period, said pixel circuits set a voltage across said storage capacitor to a voltage more than a threshold voltage of said driving transistor, and set the voltage across said storage capacitor to a voltage corresponding to the threshold voltage of said driving transistor by discharging the voltage across said storage capacitor via said driving transistor, and said pixel circuits next set a terminal voltage of said storage capacitor to a voltage of said signal line to set the light emission luminance of said light emitting element in said following emission period.

15. The method according to claim 14, wherein to change the setting of the voltage of the driving signal for said signal line is to change a gain of said driving signal.

16. The method according to claim 14, wherein to change the setting of the voltage of the driving signal for said signal line is to change an offset voltage of said driving signal.

17. The method according to claim 14, wherein said pixel circuits correct variation in mobility of said driving transistor and set the light emission luminance of said light emitting element in the following said emission period by setting the terminal voltage of said storage capacitor to the voltage of said signal line by setting said writing transistor in an on state for a certain period.

* * * * *